United States Patent [19]

Pistor

[11] Patent Number: 4,639,603

[45] Date of Patent: Jan. 27, 1987

[54] IR IMAGE SOURCE USING SPECULARY REFLECTIVE TRANSPARENCY

[75] Inventor: Helmut H. Pistor, Fairfax, Va.

[73] Assignee: The United States of America as represented by the Secretary of the Army, Washington, D.C.

[21] Appl. No.: 747,207

[22] Filed: Jun. 21, 1985

[51] Int. Cl.$^4$ ............... G01M 11/00; G03B 21/00
[52] U.S. Cl. ............... 250/504 R; 250/252.1; 250/330; 250/493.1; 273/348.1
[58] Field of Search ............... 250/330, 504 R, 493.1, 250/252.1, 503.1, 495.1; 273/358.1, 348.1, 348; 353/11, 12; 430/DIG. 944

[56] References Cited

U.S. PATENT DOCUMENTS 4,178,514 12/1979 Bly ................... 250/493.1
4,605,232 8/1986 Hundstad ................... 273/348.1

FOREIGN PATENT DOCUMENTS 2067273 7/1981 United Kingdom ............ 250/504 R

OTHER PUBLICATIONS

Samuel H. Liggero, Kenneth J. McCarthy and Joseph A. Stella, "The Polaroid 35 mm Instant Slide System" Polaroid Corporation publication based on lectures given in 1983 (undated) pp. 1-16.

Primary Examiner—Janice A. Howell
Assistant Examiner—Constantine Hannaher
Attorney, Agent, or Firm—Max L. Harwell; John E. Holford; Anthony T. Lane

[57] ABSTRACT

A new technique is provided for the simulation of light images. The technique uses a type of film which is currently marketed under the trade name "Polapan CT", "Polagraph HC" or "Polachrome CS". In addition to transmitting and reflecting frequencies in the visible spectrum and higher frequencies these films will similarly accommodate frequencies from just below the visible spectrum down to at least 14 microns. Means are provided for registering images formed in various parts of the light spectra mentioned above for analysis and test purposes.

8 Claims, 6 Drawing Figures

IR IMAGE SOURCE USING SPECULARY REFLECTIVE TRANSPARENCY

IR IMAGE MODULATOR

The invention described herein may be manufactured, used, and licensed by the U.S. Government for governmental purposes without the payment of any royalties thereon.

BACKGROUND OF THE INVENTION

Field of the Invention

This invention is related to IR imaging devices particularly a means for the testing and evaluation of such devices over a broad-spectrum of wavelengths from at least 14 micrometers to the edge of the visible spectrum.

DESCRIPTION OF PRIOR ART

In all types of optical surveillance systems from astronomical telescopes to one-man-portable devices, there has been a continuous effort to expand the information gathered by increasing the bandwidth of the radiation involved. As yet, no one device can span all of the frequencies even over the spectrum broadly described as infra-red (IR). For example the wavelengths from 8 to 14 micrometers have been investigated using a unique family of far-infrared (FIR) solid state detection devices which are different from the specialized IR cameras, vidicons and the like which operate close to the visible spectrum. Efforts are currently underway to combine the data from devices operating in different bands of radiation, hopefully in real-time, so that meaningful correlations can be observed.

A valuable tool for furthering this type of research and development is an image simulator. Unfortunately the methods of image simulation at far-infrared frequencies are radically different from those at visible and near-visible frequencies. The usual method is first to record scenes and test patterns as visible images or in computer memories. One approach proposed is that the computer data might be used to control tiny individual electrical heaters acting as pixel elements. But this appears to be much too complex to be practical for large numbers of picture elements (pixels). Attempts have been made to project far-infrared through phototransparencies, but the radiant energy was largely absorbed and reradiated by the materials in the transparency completely degrading the image beyond any usefulness for test purposes. To avoid the latter, it has been further proposed that the support layer of the transparency be made of zinc-selenide, or another material which passes infrared, bearing an image etched in metal. These materials, however, are too expensive and fragile for the large collections of images or motion pictures currently envisioned.

SUMMARY OF THE INVENTION

In spite of the failures involved in attempting to project FIR images with photographic transparencies, applicant has discovered that a new film, which is marketed for use in the visible spectrum, coincidentally can be used to project images in the IR with excellent dynamic range and resolution. Positive or negative images can be formed by either passing IR or FIR through or reflecting it off a surface in the film or transparency. Since the same is true for visible and ultraviolet all such images can be projected and, if desired, with several bands of wavelengths in registration, to test the more sophisticated broad band surveillance devices now in research or development.

DESCRIPTION OF PREFERRED EMBODIMENT

As previously mentioned the projecting of infrared images, i.e. those involving photon wavelengths of 3 to 14 micrometers, from photographic transparencies has been unsuccessful due to the absorptive and heat dispersive qualities of the emulsions and base support layers. Applicant has discovered, however, that a new film recently marketed for exposure and viewing in the visible spectrum does not display these qualities to the degree found in other films. The new films are sold under the trademark "POLAPAN CT" and "POLAGRAPH HC" which are 35 mm black and white films. There is also a color film displaying similar properties and having the trademark "POLACHROME CS". These films are manufactured by the Polaroid Corporation, Cambridge, Mass., 02139. The films which are described in the company's publication "THE POLAROID 35 mm INSTANT SLIDE SYSTEM5": by Samuel H. Liggero, Kenneth J. McCarthy and Joseph A. Stella, are based on a silver diffusion transfer process and have a polyester base 74 microns thick compared to 125 microns for other films. The positive image receiving layer is on the order of one micron thick and is covered by an abrasion resistant image protecting layer on the order of one micron thick. The color film also has a filter layer and a filter protector layer each adding one micron to the film thickness.

The main advantage for far-infrared imaging appears to lie in the positive image receiving layer. This layer is formed by photographic exposure and development using a silver diffusion process in which the image is defined by mirror like planar patches of pure silver which are specular reflectors in contrast to the black patches usually found in such transparencies. The patches apparently reflect rather than absorb incident photons. With these films the applicant has shown that a photographic image having density modulations which are rendered specularly reflective can be used to project an IR image.

Figure 1:
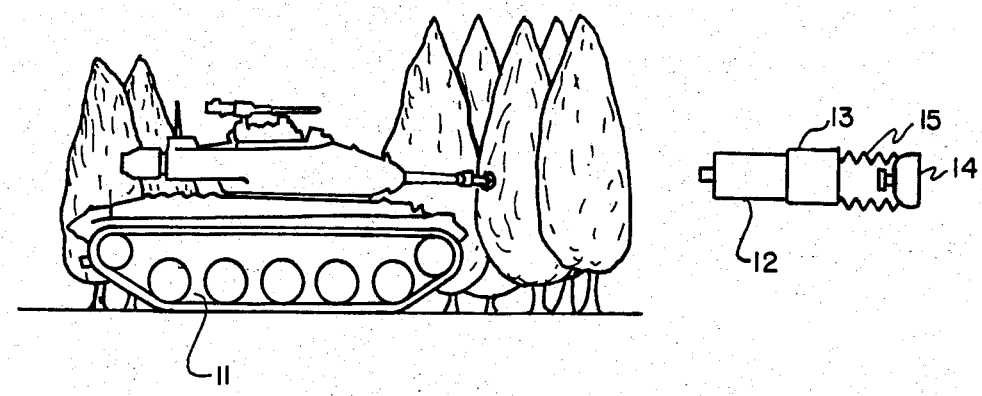
FIG. 1 shows a photographic system for recording FIR images.

Referring to FIG. 1, since common photographic emulsions are not sensitive to far-infrared radiation, the image of the scene 11 is first formed using a far-infrared detector system, video recording, or computer driven image synthesizer 12 which produces an image on a cathode ray tube (CRT) 13. The U.S. Army DL-1 FLIR detector is a typical example. In many such systems the image can be switched from positive to negative to facilitate viewing by the user. The FIR image transparencies or slides can then be photographed with a still or motion picture camera 14 focussed on the CRT screen. A bellows 15 can be added to exclude ambient light, if required. The IR projectable film may be exposed as described above or copied from any film so exposed. The transparencies are compatible with metal toning processes such as gold toning to modify IR reflectance or emissivity for a particular application.

Figure 2:
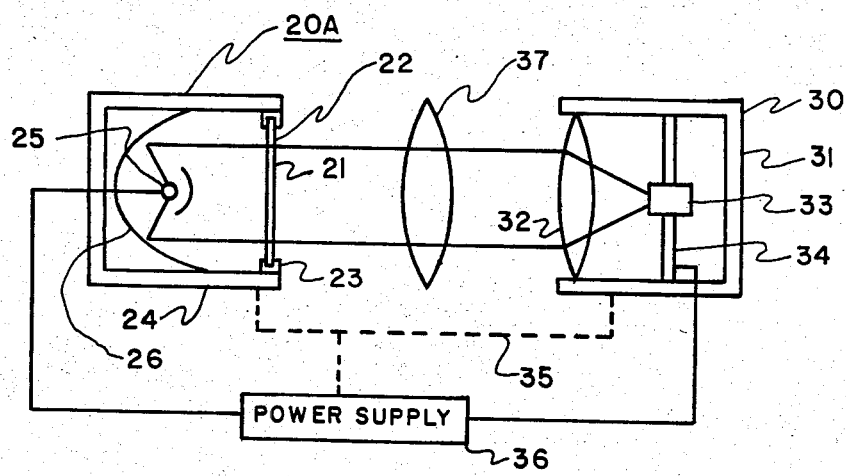
FIG. 2 shows a direct image version of a test system according to the present invention.

FIG. 2 shows a direct view test apparatus. The transparency 21 which consists of a a continuous motion picture, film strip or a single frame mounted in a cardboard, plastic or metal frame 22, passes from an automatic dispenser or by manual insertion into a receptacle 23 mounted in the front opening of the housing 24 on a projector 20A. The housing also contains an IR source. This could be a large flat radiator the size of the transparency, but is preferably a small radiator 25, such as a filament, with a parabolic reflector 26 to produce a parallel beam with a cross-section to match the slide. The temperature of the source 25 should be proportional to its distance from the slide, when high temperatures are required, to avoid heat damage in the slide. A collimating lens 37 of Germanium or other suitably IR transmissive material further accomodates the focussing range of the imaging system.

The thus illuminated transparency may then be used to test an FIR imaging system 30 in a laboratory or training environment. Such systems in general will have a housing 31 in which is mounted an objective lens 32, an FIR detector 33 (usually an array of solid state devices) and a circuit board 34 containing solid state electronics which process the detector output signals into a signal format that drives a CRT monitor video recorder or the input terminals of a computer. Some detectors also require cooling equipment. The relative position between the projector 20A and the imager 30 may be maintained by mounting them on an optical bench 35 or by the use of special adaptors which would vary from system to system. The two may also share a common power supply 36 indigenous to either system.

Figure 3:
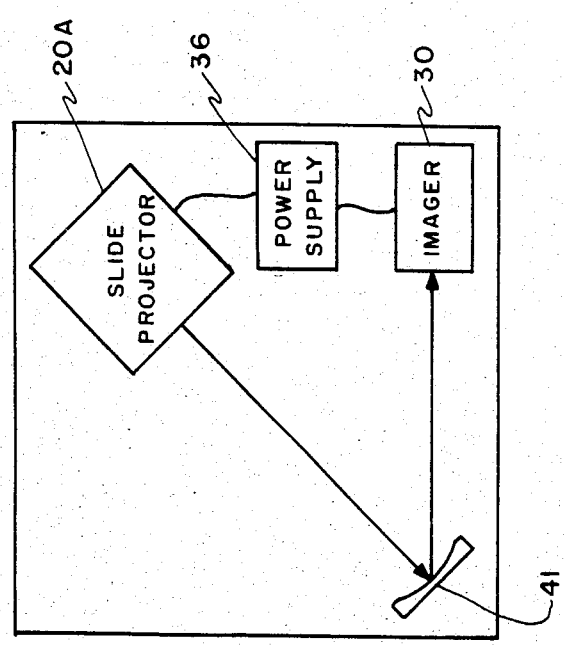
FIG. 3 shows a parabolic mirror reflected image version of the system of FIG. 2.

FIG. 3 shows a slightly different test system wherein the projector 20A and the imager 30 are mounted adjacent one another. The image is reflected from one to the other by means of a parabolic mirror 41, in place of a collimating lens. Such a collimator may have more desirable band pass characteristics than the refractive collimator 37 in FIG. 2.

Figure 4:
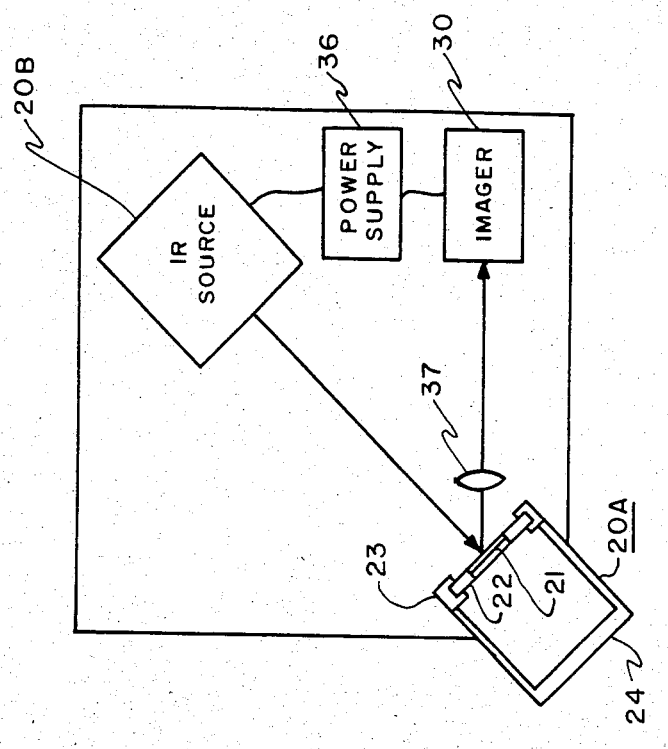
FIG. 4 shows a different modification of the system using the principles of FIG. 2 and a surface reflection of the transparency.

FIG. 4 shows another embodiment of the test system wherein the slide 21 in projector 20A is further illuminated by another projector 20B which has no slide. Indeed the projector 20A might be replaced with only the receptacle 23 and the projector 20B can be any FIR source. Since the latter is reflected from the emulsion side of the slide it penetrates only the emulsion layer and its thin protective layer and should cause less heating. It is also easier to remotely separate this source from the slide. This allows the use of a source with an extreme temperature as found in many man-made environments. Either of the projectors (sources) could be a blackbody heated or cooled electronically as by the Peltier Effect. Illuminating the slide as described above from both sides permits a very extensive range of contrasts from positive to negative.

Figure 5:
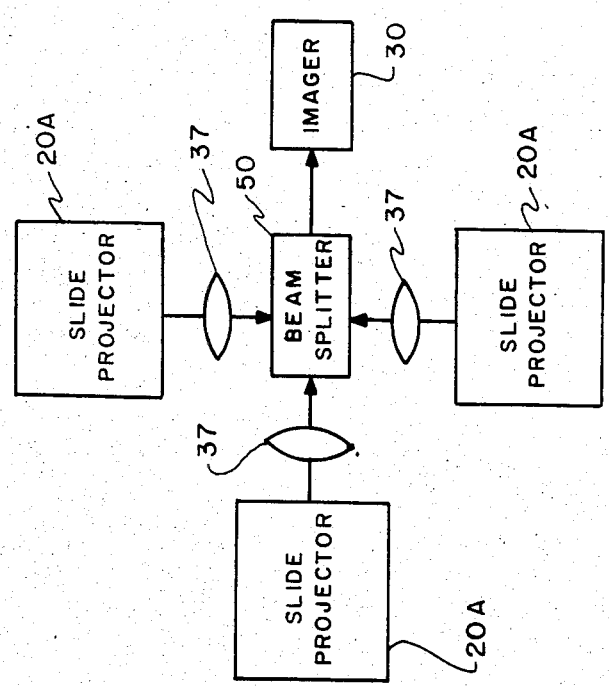
FIG. 5 shows an image combining system using the principles of FIG. 2.

FIG. 5 shows a direct imaging system similar to FIG. 2 but utilizing a plurality of projectors 20A. The images can appear in registration to the imager. They are superimposed by two orthogonal beam splitters in element 50 ahead of the imager 30. The beam splitters can be separated normal to the view shown or each be transparent to frequencies of projectors they do not reflect. Each projector operates at a different wavelength, and the images are spectral separations of the same scene. This arrangement permits precise control of elemental temperatures in a single scene.

Figure 6:
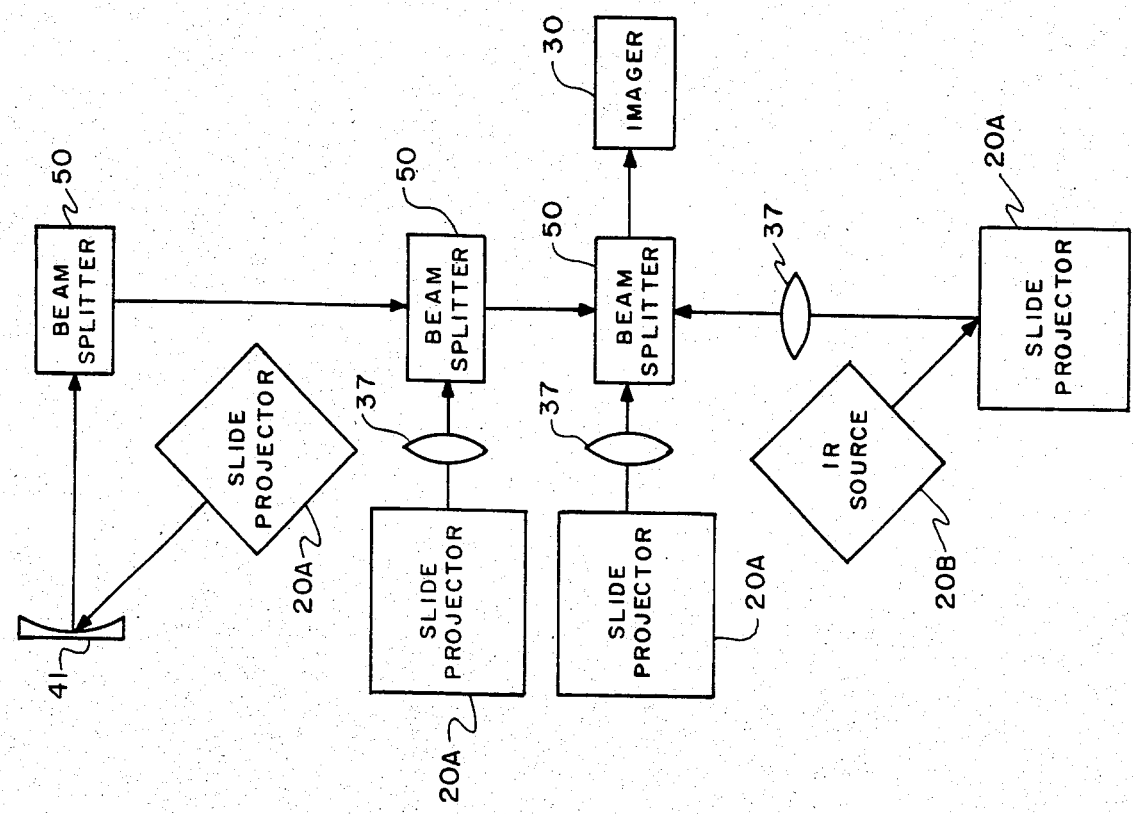
FIG. 6 shows an image combining system using the principles of FIGS. 2, 3, and 4.

FIG. 6 shows a system similar to FIG. 5 but much more complex. The projecting techniques of FIGS. 2, 3, and 4 are combined using projectors 20A, and 20B to give a wide range of temperatures and/or wavelengths in a single image or scene at imager 30. Projector 20B, like projector 20B in FIG. 4, does not support the slide but reflects off the surface of the slide in projector 20A. This has the effect of reversing or modifying the image produced by projector 20A in a highly controllable manner. This in turn can be reversed by using a negative of the slide. The silver portions of the transparency normally reflect the IR from projector 20A and appear cooler to the imager than the unobstructed direct radiation. Projector 20B can reflect even higher temperature FIR from these areas to make them appear hotter than their surroundings. Thus the balance between projectors 20A and 20B determines not only the spectral distribution, but also the contrast of that image.

While the transparencies have been described as FIR images of naturally occuring scenes, which is extremely useful, the scenes can also be artificial in nature, such as patterns of parallel lines, concentric circles and the like. The techniques described can obviously be extended to motion picture equipment and thus be used to test the dynamic qualities such as MTF, D* and the like. An advantage of this method is flicker-free projection provided for example by the Scanagon type of projector and the ability preheat or cool the film stock before it enters the film gate.

I claim:
1. A FIR image projector comprising:
   a source of FIR radiation;
   a transparency in the path of said radiation, said transparency having;
   a base layer,
   an image receiving layer on said base layer containing an image of specularly reflective silver,
   and a layer of transparent abrasion resistant material over said emulsion layer.
2. A projector according to claim 1 wherein:
   said transparency is formed from a 35 mm film based on a silver diffusion transfer process.
3. A projector according to claim 1 wherein:
   said transparency is formed from a 35 mm film having high contrast and based on a silver diffusion transfer process.
4. A projector according to claim 1 wherein:
   said transparency is formed from a 35 mm color film based on a silver diffusion transfer process.
5. The method of forming an FIR image comprising the steps of:
   electro-optically forming a first visible image from the FIR radiation emitted by a target scene;
   photographically reproducing said visible image on a photographic film having a silver image after development that is specularly reflective; and
   illuminating said silver image from one direction with FIR radiation.
6. The method according to claim 5, further including the steps of:
   viewing said film from a second direction with an IR imager to reform a second visible image similar to said first visible image.
7. The method according to claim 6 wherein:
   said first direction is opposite to said second direction.
8. The method according to claim 6 wherein:
   said first direction is substantially the same as said second direction.

* * * * *